(12) United States Patent
Kimchi

(10) Patent No.: US 10,745,132 B1
(45) Date of Patent: Aug. 18, 2020

(54) TOW CONTROL HANDLE FOR UNMANNED AERIAL VEHICLE

(71) Applicant: Amazon Technologies, Inc., Seattle, WA (US)

(72) Inventor: Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 527 days.

(21) Appl. No.: 15/195,491

(22) Filed: Jun. 28, 2016

(51) Int. Cl.
| | |
|---|---|
| *B64D 3/00* | (2006.01) |
| *B64C 39/02* | (2006.01) |
| *G05D 1/00* | (2006.01) |
| *G05D 1/10* | (2006.01) |

(52) U.S. Cl.
CPC .............. *B64D 3/00* (2013.01); *B64C 39/024* (2013.01); *G05D 1/0011* (2013.01); *G05D 1/0061* (2013.01); *G05D 1/101* (2013.01)

(58) Field of Classification Search
CPC ...... B64D 3/00; B64C 39/024; G05D 1/0011; G05D 1/0061; G05D 1/101
USPC ............................................................ 701/2
See application file for complete search history.

(56) References Cited

U.S. PATENT DOCUMENTS

| | | | | | |
|---|---|---|---|---|---|
| 4,904,993 | A | * | 2/1990 | Sato .................... | G07C 9/00182 340/12.5 |
| 5,041,040 | A | * | 8/1991 | Jones .................... | B63B 35/731 114/253 |
| 5,167,550 | A | * | 12/1992 | Nielsen ................. | B63B 35/731 114/253 |
| 6,149,435 | A | * | 11/2000 | Park ......................... | G09B 9/48 434/30 |
| 6,407,779 | B1 | * | 6/2002 | Herz .................. | H04N 5/44513 340/12.3 |
| 8,465,333 | B2 | * | 6/2013 | Sells ...................... | B63H 25/02 440/1 |
| 9,085,362 | B1 | * | 7/2015 | Kilian ....................... | B64F 1/02 |
| 9,422,139 | B1 | * | 8/2016 | Bialkowski ........... | B64C 39/024 |
| 9,592,911 | B2 | * | 3/2017 | Liu ........................ | B64C 39/024 |
| D783,021 | S | * | 4/2017 | Peel ............................ | D14/218 |
| 9,891,620 | B2 | * | 2/2018 | Green .................. | G05D 1/0033 |
| 2005/0124234 | A1 | * | 6/2005 | Sells ...................... | B63H 21/24 440/33 |
| 2009/0276105 | A1 | * | 11/2009 | Lacaze ................. | G05D 1/0044 701/2 |

(Continued)

OTHER PUBLICATIONS

"Snowboarder towed by Aerones drone—Droneboarding", published by www.youtube.com/watch?v=cj39IrKPUp4, on Jan. 22, 2016.

(Continued)

*Primary Examiner* — Anne Marie Antonucci
(74) *Attorney, Agent, or Firm* — Athorus, PLLC

(57) ABSTRACT

A towing system is provided that includes a tow control handle that is attached by a tow line to an unmanned aerial vehicle ("UAV") for towing a user. The tow control handle may include various control elements (e.g., sensors, buttons, switches, rotatable portions, etc.) which may be actuated by a user to provide control signals that are utilized for controlling various aspects of the flight of the UAV (e.g., direction, speed, etc.) A user device that is worn or otherwise carried by the user enables the user to summon the UAV to the user's location when a towing process is to begin and/or when a user is to re-acquire the tow control handle (e.g., after the user releases the tow control handle during the towing process, etc.)

23 Claims, 10 Drawing Sheets

(56) References Cited

U.S. PATENT DOCUMENTS

| | | | | |
|---|---|---|---|---|
| 2011/0006151 A1* | 1/2011 | Beard | ............... | B64C 39/028 |
| | | | | 244/3 |
| 2012/0091259 A1* | 4/2012 | Morris | ............... | B64C 27/02 |
| | | | | 244/17.13 |
| 2014/0262577 A1* | 9/2014 | Ambrisco | ............ | B60D 1/14 |
| | | | | 180/167 |
| 2016/0189101 A1* | 6/2016 | Kantor | ............ | G08G 5/0013 |
| | | | | 705/338 |
| 2016/0240087 A1* | 8/2016 | Kube | ............ | G08G 5/006 |
| 2016/0340006 A1* | 11/2016 | Tang | ................ | B63C 9/01 |
| 2017/0205820 A1* | 7/2017 | Liu | ................ | G05D 1/0016 |
| 2018/0350243 A1* | 12/2018 | Priest | ............ | G08G 5/0034 |

OTHER PUBLICATIONS

"Water Jet Pack", published by www.youtube.com/watch?v=aiE58Ri5axQ, on Jun. 16, 2012.

\* cited by examiner

TOW CONTROL HANDLE FOR UNMANNED AERIAL VEHICLE

BACKGROUND

Unmanned aerial vehicles are continuing to increase in use. For example, unmanned aerial vehicles are often used for surveillance. There is also discussion of electronic-commerce retailers, and other entities, delivering items directly to a user's home using unmanned aerial vehicles. While there are various known uses for unmanned aerial vehicles, certain techniques for controlling the unmanned aerial vehicles are relatively limiting with respect to other uses. For example, current hand-operated remote controls for automated aerial vehicles are not conducive to users being able to operate the remote controls while simultaneously utilizing their hands for other purposes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
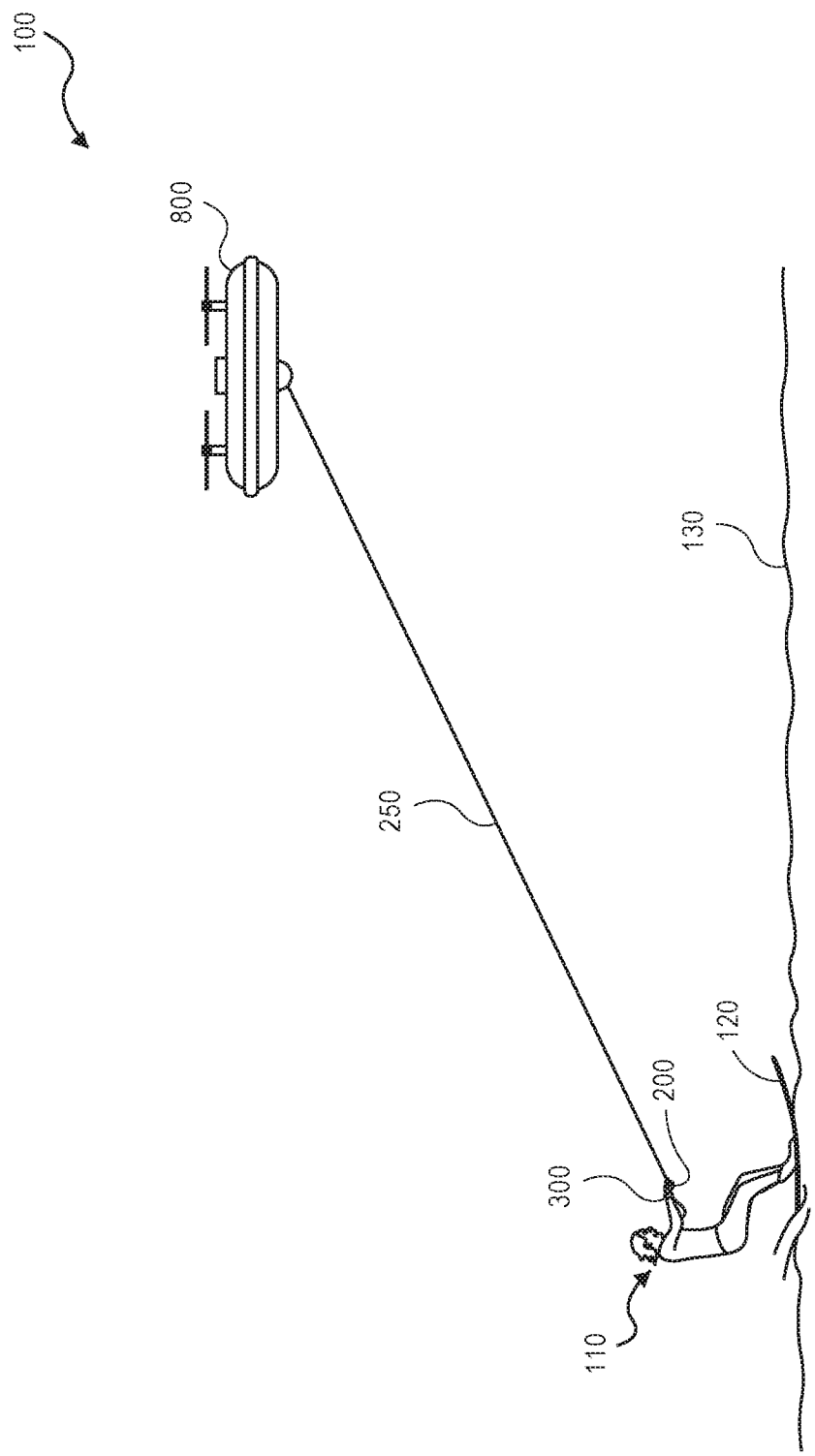
FIG. 1 is a diagram of a towing system including a tow control handle as held by a user and as attached by a tow line to an unmanned aerial vehicle, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes a towing system including a tow control handle that is attached by a tow line to an unmanned aerial vehicle ("UAV"). The tow control handle may include various control elements (e.g., sensors, buttons, switches, rotatable portions, etc.) that may be activated by a user to provide control signals that are utilized for controlling various aspects of the flight of the UAV. For example, a first control element may provide a first control signal that is utilized to control a direction of the UAV, while a second control element may provide a second control signal that is utilized to control a speed of the UAV. Additional control elements may be utilized to control additional aspects of the flight of a UAV (e.g., a flying height, an autopilot function, etc.)

In various implementations, the tow control handle may include left and right hand engagement areas where a user's left and right hands grip the tow control handle. Certain control elements (e.g., buttons, switches, etc.) may be located between the left and right hand engagement areas, so as to allow operations to be performed with a user's thumbs or adjacent fingers while the user continues to grip the left and right hand engagement areas with the user's other fingers. One or more control elements may also be located on end portions of the tow control handle that are outside of the hand engagement areas, so as to reduce the likelihood of accidental pressing or other actuation of the control elements while the user is gripping the tow control handle. In various implementations, the hand engagement areas may include one or more sensors that are configured to indicate when a user has released the tow control handle.

In various implementations, the towing system may also include a user device that is configured to be worn or otherwise carried by the user. For example, the user device may be worn on a user's wrist, arm, leg, or may be carried in a user's pocket, etc. In various implementations, the user device may include one or more control elements (e.g., buttons, switches, etc.) which a user may activate in order to wirelessly transmit various instructions to the UAV. For example, a summoning instruction may be wirelessly transmitted to summon the UAV to fly to a user's location to enable the user to engage the tow control handle and begin a towing process. As another example, a departure instruction may be transmitted to direct the UAV to fly to a designated location after the user has released the tow control handle.

In various implementations, the UAV may also include capabilities for avoiding obstacles during the towing process. For example, the UAV may utilize sense and avoid procedures for avoiding obstacles that are detected or otherwise determined along a flight path for the UAV during a towing process. As another example, the UAV and/or tow control handle may include capabilities for detecting obstacles in a travel path of the user and/or tow line during the towing process, for which the UAV may be flown so that the tow line and the user avoid the obstacles. In various implementations, a designated travel area may be determined, and the flying of the UAV may be controlled to prevent at least one of the UAV or the user from traveling outside of the designated travel area. For example, when a user is snow skiing in a mountainous area, a designated travel area may be determined that avoids cliffs or other dangerous areas. In various implementations, other issues and/or areas that should be avoided by the UAV and/or user may be dynamically determined (e.g., utilizing sensors onboard the UAV, using data from external systems, etc.) For example, various types of hazards (e.g., inclement weather, presence of dangerous wildlife, etc.) may be dynamically determined that should be avoided by the UAV and/or user. As part of such controls for avoiding obstacles or unsafe areas, the UAV may be configured to override or modify control signals received from the tow control handle or otherwise provide a warning when a user attempts to control the UAV to fly into such areas.

In various implementations, the disclosed towing system may be utilized for various purposes. For example, the towing system may be utilized as a virtual ski-lift, where a skier at the bottom of a slope may use the towing system to be towed to the top. As another example, an extreme skier may use the towing system to reach a remote ski area or to customize their skiing experience (e.g., off a designated run and for reaching fresh powder, etc.) As another example, a rescue skier may utilize the towing system to reach an injured person and/or the injured person may use the towing system to be towed from an area that may generally be inaccessible by other rescue vehicles and/or for which there is currently limited time and/or resources for reaching the area. As other examples, the towing system may similarly be utilized for applications in water skiing, surfing, skating, and other activities where a user may be towed.

FIG. 1 is a diagram of a towing system 100 including a tow control handle 200 as held by a user 110 and as coupled by a tow line 250 to a UAV 800 that is towing the user, according to some implementations. In various implementations, the user 110 may be riding or otherwise positioned on one or more conveyance devices 120 (e.g., skis, boards, wheeled apparatus, etc.), which move over a surface 130 (e.g., snow, water, sand, ground, etc.) as the user 110 is towed by the UAV 800. As will be described in more detail below, the tow control handle 200 may include various control elements (e.g., buttons, switches, sensors, rotatable portions, etc.) that enable the user 110 to control the UAV 800 (e.g., for controlling the speed, direction of travel, etc.) The user may also carry a user device 300 (e.g., as worn on the user's wrist, carried in a user's pocket, etc.) which performs various functions (e.g., for summoning the UAV 800, enabling the UAV to locate the user 110, etc.) Various implementations of the tow control handle 200 and the user device 300 will be described in more detail below with respect to FIGS. 2A-7, and various implementations of the UAV 800 will be described in more detail below with respect to FIGS. 8 and 9.

Figure 2A:
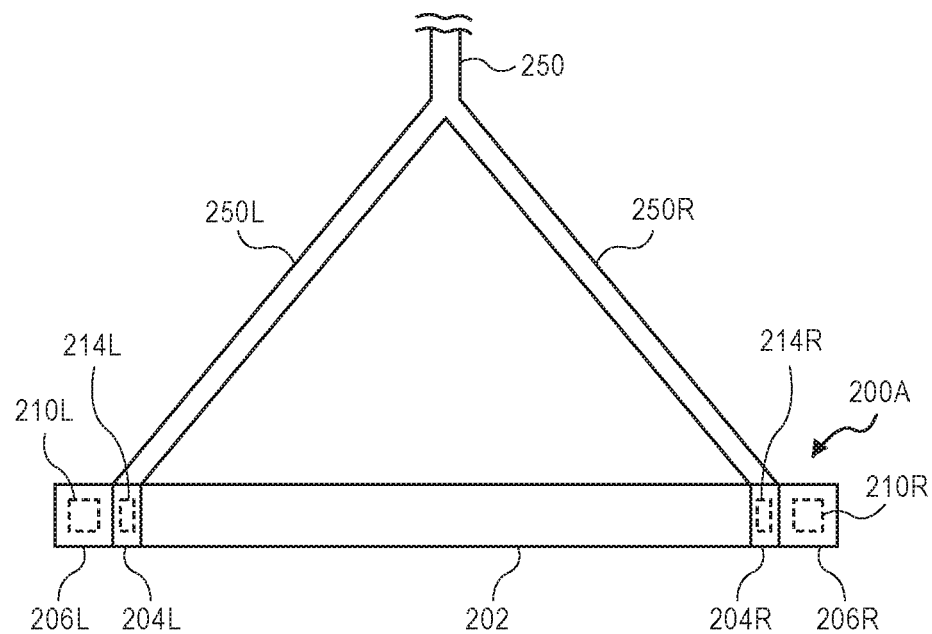
FIGS. 2A-2C are diagrams of top, end and front views of a tow control handle, according to an implementation.
Figures 2B, 2C:
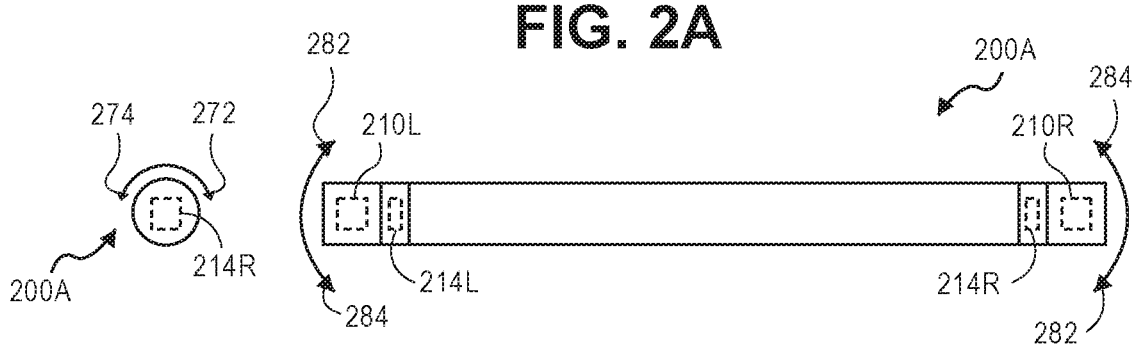

FIGS. 2A-2C are diagrams of top, end and front views of a tow control handle 200A, according to an implementation. As shown in the top view of FIG. 2A, the tow control handle 200A includes a central portion 202, tow line coupling portions 204L and 204R and end portions 206L and 206R. The tow line coupling portions 204L and 204R are coupled to line sections 250L and 250R, respectively, of the tow line 250. For example, the tow line 250 (e.g., a rope, cable, etc.) may be configured such that the line sections 250L and 250R wrap around or are otherwise coupled to the line coupling portions 204L and 204R, respectively.

In various implementations, the tow control handle may include various types of control elements (e.g., sensors, buttons, switches, etc.) that may be actuated by a user for controlling the UAV. In the example of FIG. 2A, the control elements include sensors 210L, 210R, 214L and 214R (e.g., accelerometers, tilt sensors, rotation sensors, pressure sensors, touch sensors, etc.) which are included in the end portions 206L and 206R and in the tow line coupling portions 204L and 204R, respectively. The sensors 210L, 210R, 214L and 214R are used to sense various types of input that may be provided by the user and to provide corresponding control signals, as will be described in more detail below with respect to FIGS. 2B and 2C. In various implementations, the tow control handle 200A may also include a handle control system, as will be described in more detail below with respect to FIG. 6, and which may receive and/or process control signals provided by the sensors 210L, 210R, 214L and 214R.

As illustrated in the end view of FIG. 2B, one or more portions of the tow control handle 200A may be rotatable in a forward direction 272 or a backward direction 274. For example, the central portion 202 may be separately rotatable (e.g., in a throttle configuration) relative to the end portions 206L and 206R, such that the rotation may be sensed by the sensors 214L and 214R, or by other sensors within the tow control handle 200A. As another example, the end portions 206L and 206R may be individually rotatable relative to the central portion 202, such that the rotation may be sensed by the sensors 214L and 214R, or by other sensors within the tow control handle 200A. As another example, the central portion 202 may be divided in half or may otherwise include separately rotatable portions. As another example, the sensors 214L and 214R may be utilized for sensing rotation of the tow control handle 200B relative to the tow line sections 250L and 250R. For example, the tow line sections 250L and 250R may include corresponding elements (e.g., metal portions, magnets, etc.), such that the rotation of the tow control handle 200B relative to the tow line sections 250L and 250R can be sensed by the sensors 214L and 214R. In various implementations, the sensors 214L and 214R may provide control signals that are indicative of the sensed direction of rotation and the sensed amount of rotation. For example, a rotation in the forward direction 272 may produce a control signal that is utilized to control an increase in speed of the UAV 800, while a rotation in the reverse direction 274 may produce a control signal that is utilized to control a decrease in speed of the UAV 800.

As illustrated in the front view of FIG. 2C, the tow control handle 200A may also be rotated in a clockwise direction 282 or a counterclockwise direction 284 (e.g., with a rotation axis approximately defined by the tow line 250). In various implementations, such rotation may be sensed by the sensors 210L and 210R (e.g., which may be tilt sensors, etc.) In various implementations, the sensors 210L and 210R may provide control signals that are indicative of the sensed direction of rotation and the sensed amount of rotation, which may be utilized for controlling a direction of the UAV. For example, a rotation of the tow control handle 200A in the clockwise direction 282 may produce a control signal that is utilized to control a right turn of the UAV 800, while a rotation in the counterclockwise direction 284 may produce a control signal that is utilized to control a left turn of the UAV 800. Additional examples of control elements (e.g., sensors, buttons, etc.) and related operations will be described in more detail below with respect to FIG. 4.

Figure 3:
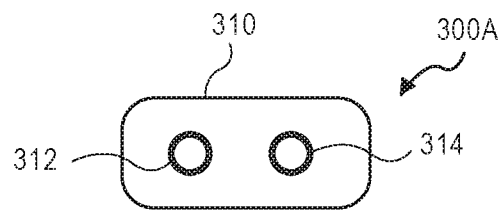
FIG. 3 is a diagram of a user device that is utilized in conjunction with an unmanned aerial vehicle and tow control handle, according to an implementation.

FIG. 3 is a diagram of a user device 300A that is utilized in conjunction with an unmanned aerial vehicle and tow control handle, according to an implementation. As illustrated in FIG. 3, the user device 300A includes a body 310 and control elements including buttons 312 and 314. In various implementations, the configuration of the body 310 may vary depending on how the user device 300A is to be worn or carried by a user. For example, the body 310 may include a strap (not shown) or otherwise be formed as a band or other configuration for being worn on a user's wrist, arm, leg, or for being carried in a user's pocket, etc.

In various implementations, the buttons 312 and 314 may be utilized for various control functions. For example, in response to an actuation of the button 312, a summoning instruction may be provided for summoning a UAV 800 to a user's location. In various implementations, the user device 300A may also include a location system for assisting the UAV 800 in locating the user, as will be described in more detail below with respect to FIG. 7. Such locating capabilities may enable the UAV to be flown (e.g., as it is hovering with the tow control handle at the end of the tow line below) to position the tow control handle 200A proximate to the user so that it can be engaged by the user (e.g., as grabbed by the user's hands, etc.)

In various implementations, the tow control handle 200A may also include a location system, such that the location of the tow control handle 200A relative to the user device 300A may be determined as part of the positioning of the tow control handle. In another configuration, the tow control handle 200A and user device 300A may include one or more sensors for sensing a presence and/or proximity relative to one another, so as to provide an indication of when the tow control handle 200A has been positioned proximate to the user so as to allow the user to engage the tow control handle 200A. In another configuration, a location of the tow control handle may be estimated based on the flying height of the UAV and the known length of the tow line 250, which may be utilized for positioning the tow control handle proximate to the user (e.g., with the user's location determined according to the location of the user device 300A or in accordance with other location determining methods).

In various implementations, the button 314 of the user device 300A may be utilized to implement a departure function. For example, once a user has been towed to a desired location, the user may actuate the button 314, in response to which a departure instruction may be provided to the UAV 800 (e.g., for instructing the UAV to return to a home base or other designated location, etc.) It will be appreciated that while two buttons are illustrated in the example of FIG. 3, that different numbers and configurations of control elements may be utilized in various implementations (e.g., as described in more detail below with respect to FIG. 5).

Figure 4:
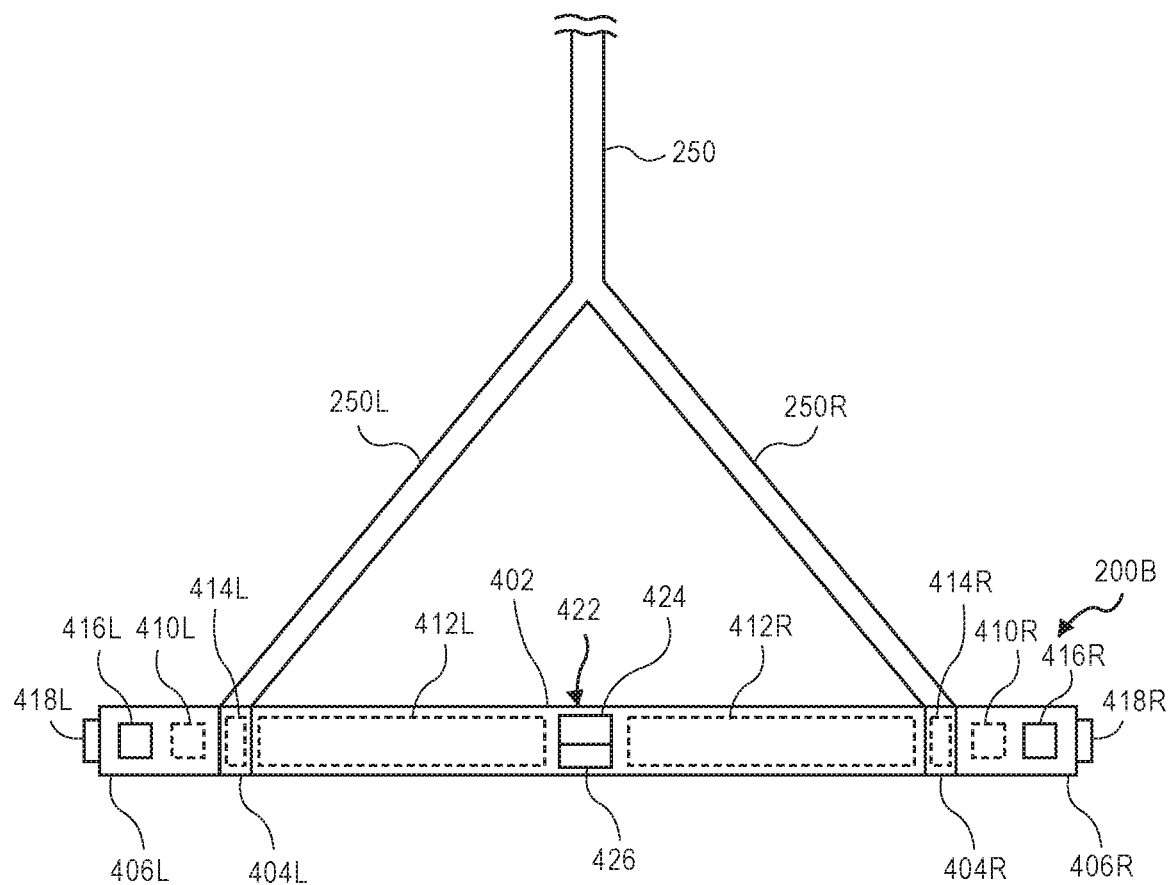
FIG. 4 is another diagram of a tow control handle, according to an implementation.

FIG. 4 is a diagram of a tow control handle 200B, according to an implementation. The tow control handle 200B includes a central portion 402, tow line coupling portions 404L and 404R, and end portions 406L and 406R. As illustrated in FIG. 4, the tow control handle 200B may include various types of control elements (e.g., sensors, buttons, switches, etc.), some of which may be similar to those described above with respect to FIG. 2. For example, as shown in FIG. 4, sensors 410L and 410R are included in the end portions 406L and 406R, and sensors 414L and 414R are included in the tow line coupling portions 404L and 404R, each of which may perform functions similar to those described above with respect to the corresponding sensors 210L, 210R, 214L and 214R of FIG. 2A, or may perform other functions.

The central portion 402 includes sensors 412L and 412R, which may generally correspond to first and second hand engagement areas (e.g., where a user may grip the tow control handle with the user's left and right hands, respectively, while being towed). A central button area 422 is located between the sensors 412L and 412R, and includes buttons 424 and 426. The end portions 406L and 406R further include buttons 416L, 416R, 418L and 418R.

In various implementations, different control signals that may be utilized for controlling the UAV may be provided based on the actuation of the various sensors and buttons of the tow control handle 200B by a user. For example, the sensors 412L and 412R may be touch sensors which are able to detect the general presence of a user's hands and/or which may sense certain inputs from a user (e.g., according to a sequence of motions or finger contacts along the length of the sensors 412L and 412R, such as a "twisting" hand motion for adjusting the speed of the UAV, etc.) As other examples, actuation of the buttons 416L, 416R, 418L, 418R, 424 and/or 426 may provide control signals that are utilized to control various functions of the UAV 800 (e.g., increases or decreases in speed, height, etc.) In various implementations, certain of the control elements (e.g., buttons 424 and 426) may be utilized to activate or deactivate other control elements on the tow control handle 200B depending on a current use of the tow control handle 200B. For example, a user who is performing certain maneuvers while being towed may need to grip various portions of the tow control handle where the user may not want the control elements in those portions to be active. In various implementations, the tow control handle 200B may also include one or more haptic or other feedback devices (e.g., in the areas of certain control elements and/or in other areas of the control handle 200B). For example, a user may receive haptic or other feedback in response to activation of a control element and/or in order to provide other information to a user (e.g., indicating when and where a user may make a turn to the right or left, indicating that a user is attempting to fly the UAV 800 into a dangerous area, etc.)

It will be appreciated that by including certain sensors and buttons in the end portions 406L and 406R, such sensors and buttons may be outside of the typical hand engagement areas (e.g., gripping areas) of the tow control handle 200B (e.g., as corresponding to the locations of the sensors 412L and 412R). In addition, it will be appreciated that the inclusion of the buttons 424 and 426 in the middle of the central portion 402 which may be between the hand engagement areas may in various implementations allow operations to be performed by a user's thumbs or adjacent fingers while the user continues to grip the hand engagement areas with the user's other fingers.

Figure 5:
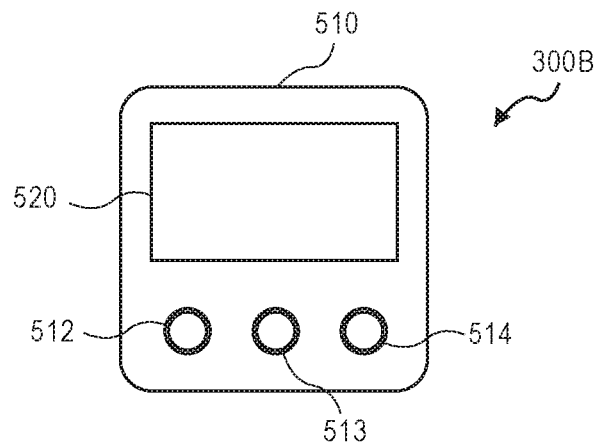
FIG. 5 is another diagram of a user device, according to an implementation.

FIG. 5 is a diagram of a user device 300B, according to an implementation. As shown in FIG. 5, the user device 300B includes a body 510 and control elements including buttons 512, 513 and 514, and a display 520. Similar to the body 310 of FIG. 3, the body 510 of FIG. 5 may be configured to be worn or otherwise carried by a user. In various implementations, the buttons 512, 513 and 514, and the display 520 may be utilized to implement various control functions. For example, in response to an actuation of the button 512, a summoning instruction may be provided for a UAV, and in response to an actuation of the button 513, a departure instruction may be provided for a UAV, similar to the operations described above with respect to FIG. 3.

As another example, in response to an actuation of the button 514, a landing instruction may be provided which directs the UAV to land at a location that is proximate to the user (e.g., so that the user may acquire the UAV for loading into a vehicle, placing in a storage area, etc.) As another example, in response to an actuation of the button 514, a height adjustment instruction may be provided which directs the UAV to adjust its flying height (e.g., to bring the tow control handle lower to be more reachable by the user, etc.) In various implementations, the display 520 may be utilized for providing information to the user (e.g., indicating a current location or distance of the UAV, an estimated time of arrival of the UAV in response to a summoning instruction, etc.) In various implementations, the display 520 may also be a touch screen display or may otherwise be configured to receive various control inputs from the user. For example, rather than including the buttons 512, 513 and 514, similar virtual buttons and/or commands may be available through the touch screen display 520 for controlling the UAV 800.

It will be appreciated that while the user device 300B has been illustrated with the buttons 512, 513 and 514 and the display 520, that different numbers and/or configurations of buttons, displays, user interface features, etc. may be included in different implementations. In various implementations, the user device may also be implemented as part of the features of another electronic device. For example, a user's smartphone or smartwatch may function as a user device, wherein various buttons, display features, etc. may be programmed for implementing various control functions for controlling the UAV, such as those described above.

Figure 6:
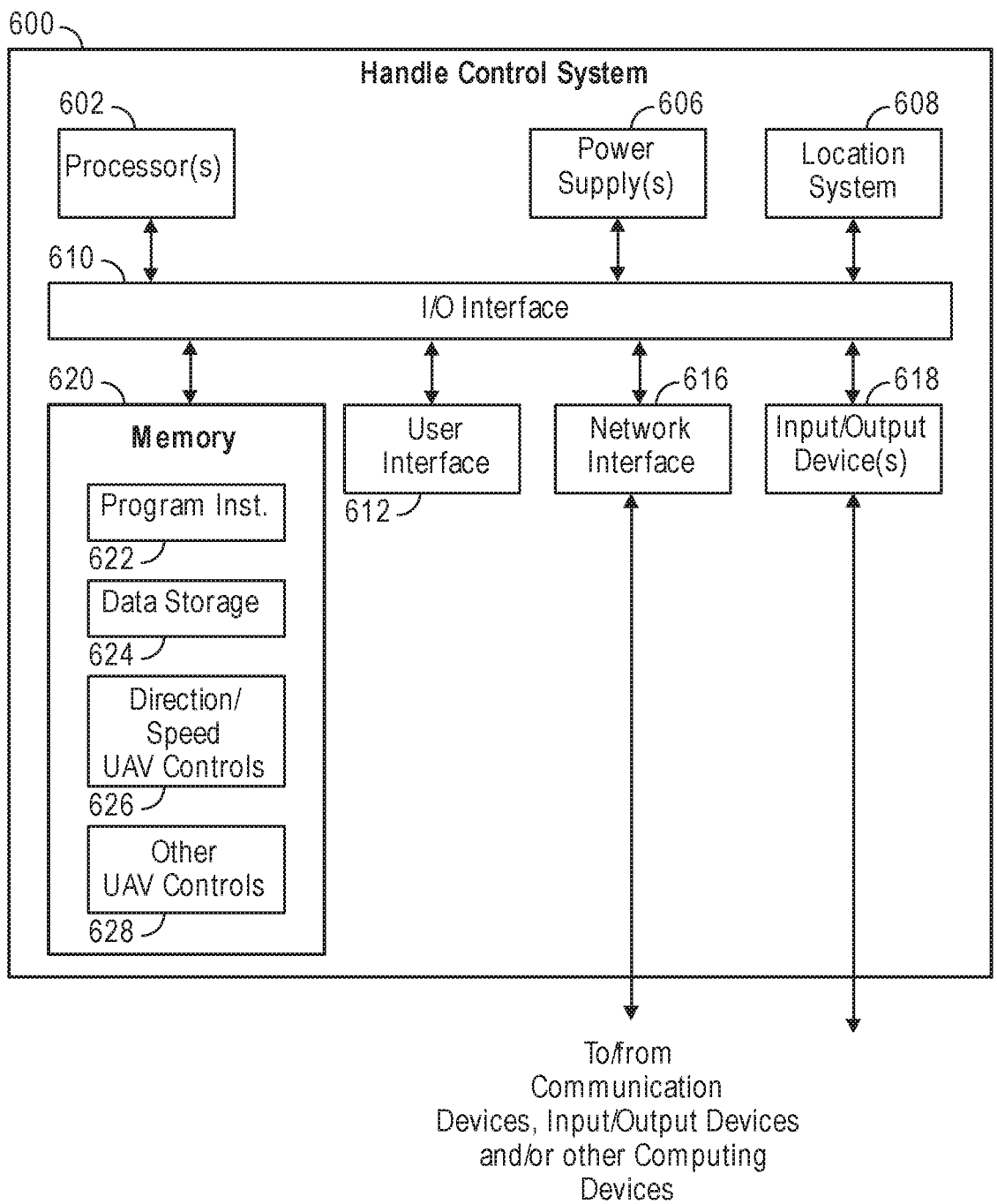
FIG. 6 is a block diagram of an illustrative implementation of a handle control system that may be used with various implementations.

FIG. 6 is a block diagram of an illustrative implementation of a handle control system 600 that may be used with various implementations. In various examples, the block diagram may be illustrative of one or more aspects of the handle control system 600 that may be used to implement the various systems and methods discussed herein and/or to control operation of a tow control handle as described herein. In the illustrated implementation, the handle control system 600 includes one or more processors 602, coupled to a memory, e.g., a non-transitory computer readable storage medium 620, via an input/output (I/O) interface 610. The handle control system 600 may also include one or more power supply modules 606, a location system 608, a user interface 612, a network interface 616, and/or one or more input/output devices 618.

In various implementations, the handle control system 600 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, and/or data items accessible by the processor(s) 602. In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 620 as program instructions 622, data storage 624, direction/speed UAV controls 626 and other UAV controls 628, respectively. In other implementations, program instructions, data and/or UAV controls may be received, sent or stored upon different types of computer-accessible media, such as non-transitory media, or on similar media separate from the non-transitory computer readable storage medium 620 or the handle control system 600. Generally speaking, a non-transitory, computer readable storage medium may include storage media or memory media such as magnetic or optical media, e.g., disk or CD/DVD-ROM, coupled to the handle control system 600 via the I/O interface 610. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The location system 608 may include a GPS, IMU or other similar system and/or sensors that enable the location of the tow control handle to be determined and/or tracked. For example, when a UAV is being flown or otherwise navigated for bringing the tow control handle to a user, the location of the tow control handle at the end of the tow line may be determined and/or tracked relative to the location of the user or a user device. In this manner, the position of the UAV as it is being flown may be controlled so as to position the tow control handle proximate or otherwise close enough to the user so that the user can engage (e.g., grab on to) the tow control handle for starting the towing process. Such location techniques for the tow control handle may also be utilized during the towing process (e.g., with respect to avoiding obstacles that may be encountered along current travel path of the user and tow line, and/or for ensuring that the user remains within a travel area that has been determined for safety, etc.) Alternatively or in addition, other techniques for determining and/or tracking the location of the tow control handle may be utilized. For example, the length of the tow line and/or other factors (e.g., wind, etc.) may be determined and utilized to estimate a location of the tow control handle relative to the UAV. As another example, various sensors (e.g., a camera onboard the UAV) may be utilized to determine the relative location of the tow control handle.

The user interface 612 may include one or more control elements (e.g., buttons, switches, sensors, elements of a GUI display, etc.) that may be actuated by a user for controlling various functions of the UAV. For example, various control elements of the user interface may be actuated by a user to control the direction, speed, height, etc. of the UAV (e.g., as implemented by the direction/speed UAV controls 626 and/or other UAV controls 628 of the memory 620, etc.) In various implementations, such controls may be implemented as various types of control signals and/or instructions that are provided to the UAV (e.g., wherein a navigation or other system of the UAV may carry out the controls and/or instructions, as will be described in more detail below with respect to the UAV control system 810 of FIG. 9).

The network interface 616 may be configured to allow data to be exchanged between the handle control system 600, other devices attached to a network, such as other computer systems (e.g., remote computing resources), and/or with other control systems of other devices (e.g., a UAV, a user device, etc.) For example, the network interface 616 may enable wireless communication between the tow control handle that includes the control system 600 and a control system that is implemented on one or more remote computing resources or other devices. For wireless communication, an antenna of the tow control handle or other communication components may be utilized. As another example, the network interface 616 may enable wireless communication between numerous devices (e.g., UAVs, user devices, tow control handles, etc.) In various implementations, the network interface 616 may support communication via wireless general data networks, such as a Wi-Fi network. For example, the network interface 616 may support communication via telecommunications networks, such as cellular communication networks, satellite networks, and the like.

Input/output devices 618 may, in some implementations, include one or more devices for determining the presence of and/or interacting with a user, UAV, obstacle, etc. For example, various input/output devices 618 may include thermal sensors, infrared sensors, accelerometers, pressure sensors, displays, cameras or other imaging devices, user interface devices, etc. Multiple input/output devices 618 may be present and controlled by the handle control system 600. In various implementations, certain devices (e.g., tow control handles, user devices, UAVs, etc.) may function as input/output devices relative to one another. For example, in one configuration, a tow control handle and a user device may function as input/output devices relative to a UAV (e.g., as will be described in more detail below with respect to the UAV control system 810 of FIG. 9). As another example, in one configuration a UAV and/or a user device may function as an input/output device relative to the tow control handle.

As shown in FIG. 6, the memory 620 may include program instructions 622, which may be configured to implement certain of the example processes and/or sub-processes described herein. The data storage 624 may include various data stores for maintaining data items that may be provided for interacting with and/or otherwise functioning relative to UAVs, user devices, etc. For example, a user may store various preferences (e.g., regarding desired speeds, travel areas, etc.) when being towed by a UAV. As another example, data related to travel paths, travel areas, general UAV controls, etc. may be stored. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Figure 7:
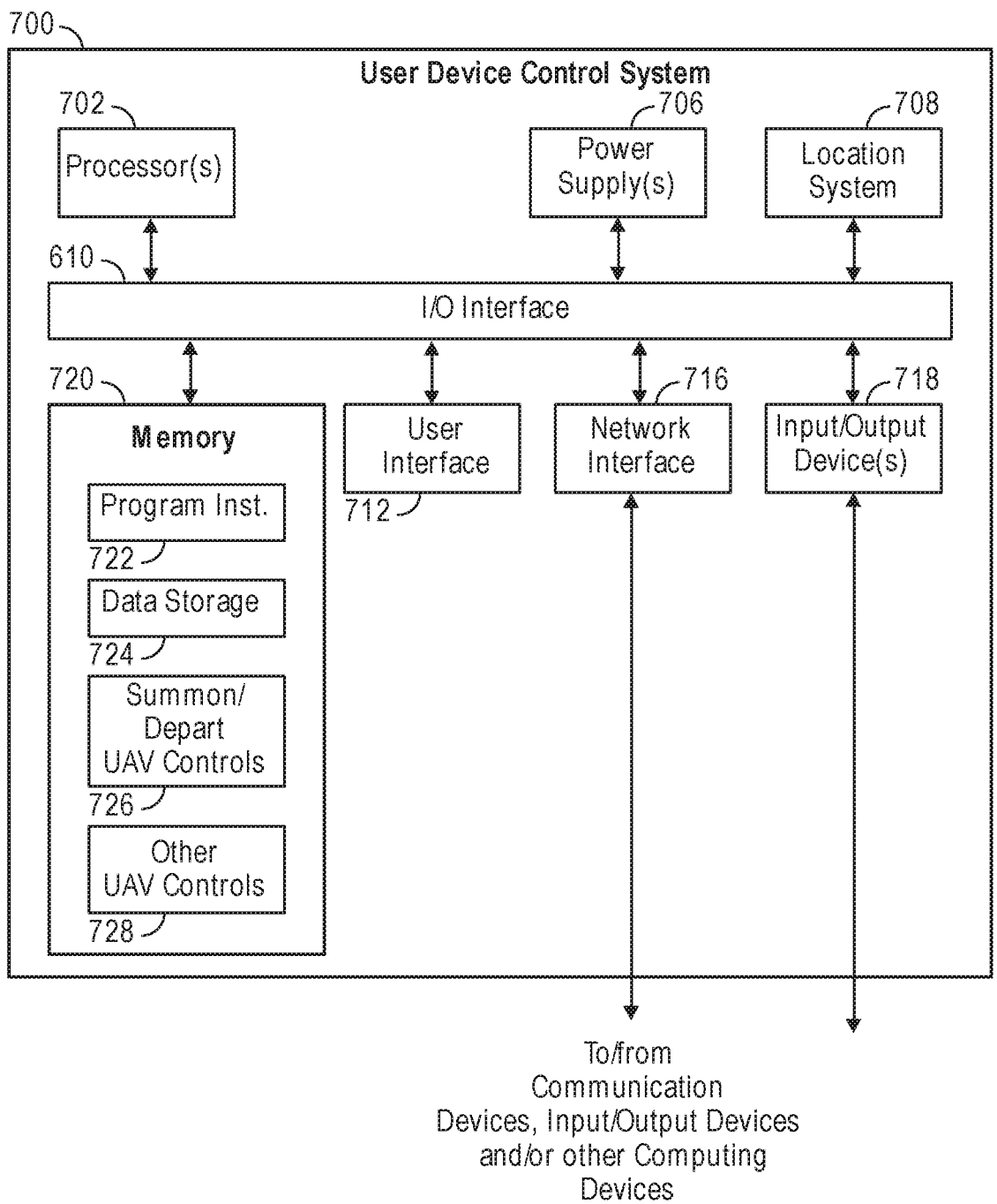
FIG. 7 is a block diagram of an illustrative implementation of a user device control system that may be used with various implementations.

FIG. 7 is a block diagram of an illustrative implementation of a user device control system 700 that may be used with various implementations. Similar to the example of FIG. 6 described above, in various implementations, the block diagram of FIG. 7 may be illustrative of one or more aspects of the user device control system 700 that may be used to implement the various systems and methods discussed herein and/or to control operation of a user device as described herein. In the illustrated implementation, the user device control system 700 includes one or more processors 702, coupled to a memory, e.g., a non-transitory computer readable storage medium 720, via an input/output (I/O) interface 710. The user device control system 700 may also include one or more power supply modules 706, a location system 708, a user interface 712, a network interface 716, and/or one or more input/output devices 718.

In various implementations, the user device control system 700 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 720 as program instructions 722, data storage 724, summon/depart UAV controls 726 and other UAV controls 728, respectively. In other implementations, program instructions, data and/or UAV controls may be received, sent or stored upon different types of computer-accessible media, such as non-transitory media, or on similar media separate from the non-transitory computer readable storage medium 720 or the user device control system 700. Generally speaking, a non-transitory, computer readable storage medium may include storage media or memory media such as magnetic or optical media, e.g., disk or CD/DVD-ROM, coupled to the user device control system 700 via the I/O interface 710. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The location system 708 may include a GPS or other similar system and/or sensors that enable the location of the user device to be determined and/or tracked. For example, when a summoning instruction is provided to a UAV, the location of the user device may be determined to enable the UAV to fly to the user's location. The determination and/or tracking of the location of the user device may also enable the UAV to bring the tow control handle back to a user when the user is to re-engage the tow control handle (e.g., if the user is skiing as part of the towing process and has let go of the tow control handle, etc.)

The user interface 712 may include one or more control elements (e.g., buttons, switches, sensors, elements of a GUI display, etc.) that may be actuated by a user for controlling various functions of the UAV. For example, various control elements of the user interface may be actuated by a user to provide a summoning instruction, a departure instruction, or other instructions or controls for the UAV (e.g., as implemented by the summon/depart UAV controls 726 and/or other UAV controls 728 of the memory 720, etc.) In various implementations, such controls may be implemented as various types of control signals and/or instructions that are provided to the UAV (e.g., wherein a navigation or other system of the UAV may carry out the controls and/or instructions, as will be described in more detail below with respect to the UAV control system 810 of FIG. 9).

The network interface 716 may be configured to allow data to be exchanged between the user device control system 700, other devices attached to a network, such as other computer systems (e.g., remote computing resources), and/or with other control systems of other devices (e.g., a UAV, a tow control handle, another user device, etc.) For example, the network interface 716 may enable wireless communication between the user device that includes the control system 700 and a control system that is implemented on one or more remote computing resources or other devices. For wireless communication, an antenna of the user device or other communication components may be utilized. As another example, the network interface 716 may enable wireless communication between numerous devices (e.g., UAVs, tow control handles, user devices, etc.) In various implementations, the network interface 716 may support communication via wireless general data networks, such as a Wi-Fi network. For example, the network interface 716 may support communication via telecommunications networks, such as cellular communication networks, satellite networks, and the like.

Input/output devices 718 may, in some implementations, include one or more devices for interacting with a user, UAV, tow control handle, etc. For example, various input/output devices 718 may include user interface devices, accelerometers, displays, imaging devices, etc. Multiple input/output devices 718 may be present and controlled by the handle control system 700. In various implementations, certain devices (e.g., UAVs, tow control handles, user devices, etc.) may function as input/output devices relative to one another. For example, in one configuration, a user device and a tow control handle may function as input/output devices relative to a UAV (e.g., as will be described in more detail below with respect to the UAV control system 810 of FIG. 9). As another example, in one configuration a UAV and/or tow control handle may function as an input/output device relative to the user device.

As shown in FIG. 7, the memory 720 may include program instructions 722, which may be configured to implement certain of the example processes and/or sub-processes described herein. The data storage 724 may include various data stores for maintaining data items that may be provided for interacting with and/or otherwise functioning relative to UAVs, tow control handles, etc. For example, an identification of a user and/or a UAV that is associated with a user device may be stored. As another example, data related to travel paths, travel areas, general UAV controls, etc. may be stored. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Figure 8:
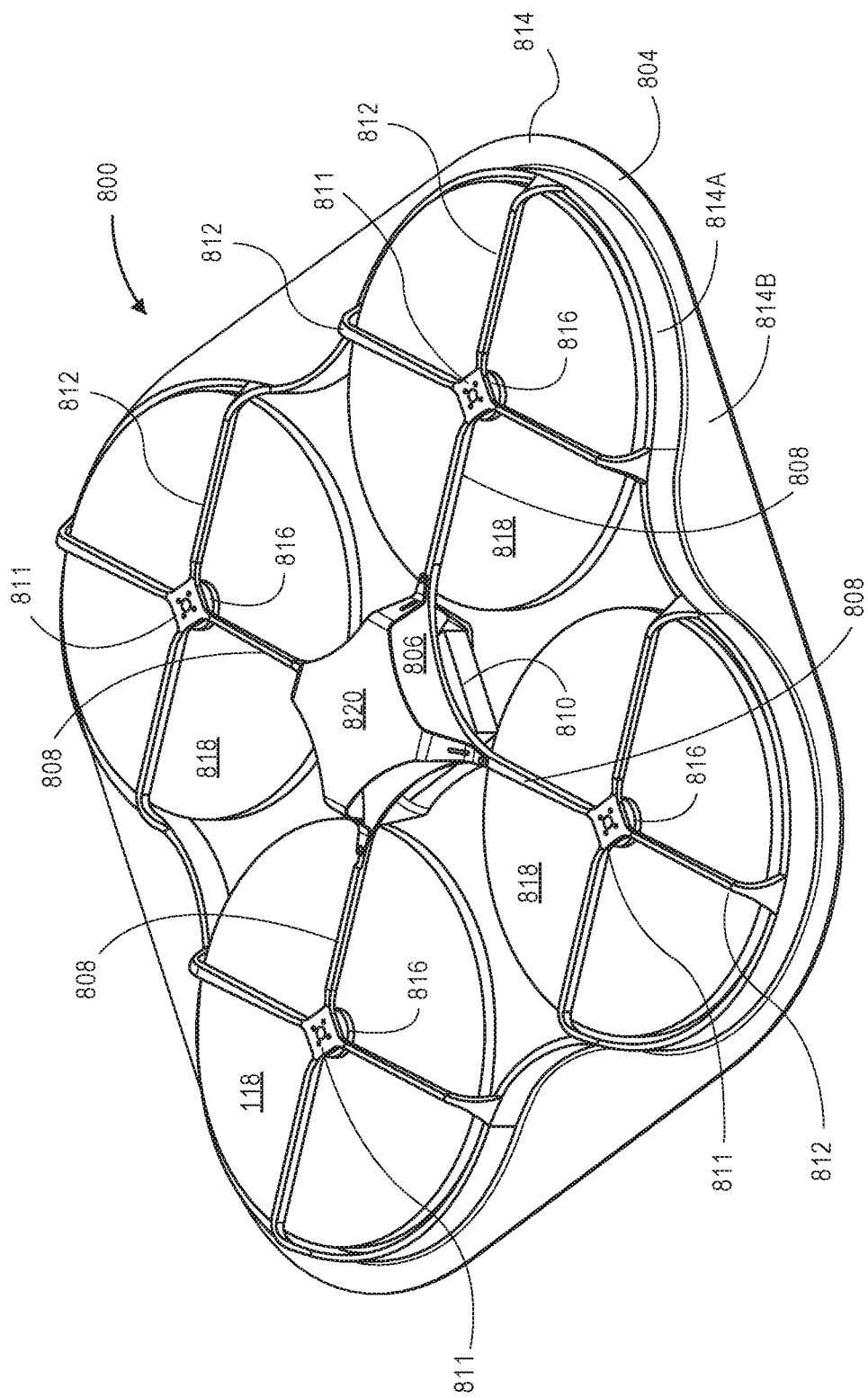
FIG. 8 is a block diagram of an unmanned aerial vehicle configuration, according to an implementation.

FIG. 8 is a block diagram of a UAV 800, according to an implementation. As illustrated, the UAV 800 includes a frame 804. The frame 804 or body of the UAV 800 may be formed of any suitable material, such as graphite, carbon fiber, aluminum, titanium, etc., or any combination thereof. In this example, the frame 804 of the UAV 800 is a single carbon fiber frame. The frame 804 includes a hub 806, motor arms 808, motor mounts 811, support arms 812, and a perimeter protective barrier 814. In this example, there is a single hub 806, four motor arms 808, four motor mounts 811, twelve support arms 812 and a single perimeter protective barrier 814.

Each of the motor arms 808 extend from the hub 806 and couple with or terminate into the motor mounts 811. Lifting motors 816 are coupled to an inner side of the motor mount 811 so that the lifting motor 816 and corresponding lifting propeller 818 are within the frame 804 as part of a propulsion system for the UAV 800. In one implementation, the lifting motors 816 are mounted so that the propeller shaft of the lifting motor that mounts to the lifting propeller 818 is facing downward with respect to the frame 804. In other implementations, the lifting motors may be mounted at other angles with respect to the frame 804 of the UAV 800. The lifting motors may be any form of motor capable of generating enough rotational speed with the propellers to lift the UAV 800 and to perform associated towing functions. For example, the lifting motors may each be a FX-4006-13 740 kv multi-rotor motor, a Tiger U-11 motor, a KDE motor, etc.

Mounted to each lifting motor 816 is a lifting propeller 818. The lifting propellers 818 may be any form of propeller (e.g., graphite, carbon fiber) and of a size sufficient to lift the UAV 800 and to perform any associated towing functions so that the UAV 800 can navigate through the air, for example, to tow a user to a towing destination. For example, the lifting propellers 818 may each be carbon fiber propellers having a dimension or diameter of twenty-nine inches. While the illustration of FIG. 8 shows the lifting propellers 818 all of a same size, in some implementations, one or more of the lifting propellers 818 may be different sizes and/or dimensions. Likewise, while this example includes four lifting propellers, in other implementations, more or fewer propellers may be utilized as lifting propellers 818. Likewise, in some implementations, the lifting propellers 818 may be positioned at different locations on the UAV 800. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

Extending from each motor mount 811 are three support arms 812 that couple with or otherwise terminate into the perimeter protective barrier 814. The perimeter protective barrier 814 extends around the perimeter of the UAV and encompasses the lifting propellers 818. In some implementations, the perimeter protective barrier 814 may include a vertical component 814A that extends substantially downward from the support arms and approximately perpendicular to the axis of rotation of the lifting propellers 818. The vertical component 814A may be of any vertical dimension and width. For example, the vertical component 814A may have a vertical dimension of approximately three inches and a width of approximately 0.5 inches. In other implementations, the vertical dimension and/or the width may be larger or smaller. Likewise, the vertical component 814A of the perimeter protective barrier may include a core, such as a foam, wood and/or plastic core. The vertical component may be coupled to each of the support arms and extend around the outer perimeter of each propeller 818 to inhibit access to the propellers from the sides of the UAV 800.

The perimeter protective barrier 814 provides safety for objects foreign to the UAV 800 by inhibiting access to the propellers 818 from the side of the UAV 800 provides protection to the UAV 800 and increases the structural integrity of the UAV 800. For example, if the UAV 800 is traveling horizontally and collides with a foreign object (e.g., wall, building, tree, etc.), the impact between the UAV and the foreign object will be with the perimeter protective barrier 814, rather than a propeller. Likewise, because the frame is interconnected, the forces from the impact are dissipated across the frame.

Likewise, the vertical component 814A provides a surface upon which one or more components of the UAV may be mounted. For example, one or more antennas may be mounted to the vertical component 814A of the perimeter protective barrier 814. The antennas may be used to transmit and/or receive wireless communications. For example, the antennas may be utilized for Wi-Fi, satellite, near field communication ("NFC"), cellular communication, or any other form of wireless communication. Other components, such as cameras, time of flight sensors, distance determining elements, gimbals, Global Positioning System (GPS) receiver/transmitter, radars, illumination elements, speakers, and/or any other component of the UAV 800 or the UAV control system (discussed below), etc., may likewise be mounted to the vertical component 814A of the perimeter protective barrier 814. Likewise, identification or reflective identifiers may be mounted to the vertical component to aid in the identification of the UAV 800.

In some implementations, the perimeter protective barrier 814 may also include a horizontal component 814B that extends outward, with respect to the UAV 800, from the vertical component 814A of the perimeter protective barrier 814. The horizontal component 814B may provide additional protective support for the UAV and/or any object with which the UAV 800 may come into contact. Similar to the vertical component 814A, the horizontal component 814B may or may not include a core. Likewise, the horizontal component 814B provides another surface to which one or more components (e.g., antennas, camera, sensors, GPS, range finders) may be mounted.

While the example illustrated in FIG. 8 shows a perimeter protective barrier 814 with a vertical component 814A and a horizontal component 814B, in other implementations, the perimeter protective barrier may have other configurations. For example, the perimeter protective barrier 814 may only include a vertical component 814A. Alternatively, the perimeter protective barrier may be angled (e.g., forty-five degree angle) with respect to the UAV 800, and extend from above the lifting propellers where it is coupled with the support arms 812 to below the lifting propellers 818. Such a configuration may improve the aerodynamics of the UAV 800. In other implementations, the perimeter protective barrier may have other configurations or designs.

In addition to providing protection for the UAV 800, the frame 804 provides structural support for the UAV 800. By interconnecting all of the components, hub 806, motor arms 808, motor mounts 811, support arms 812, and perimeter protective barrier 814, the resulting frame has structural stability and is sufficient to support the lifting motors, lifting propellers, UAV control system and/or other components of the UAV and/or a coupled tow line with a tow control handle for towing a user.

In some implementations, the frame 804 may also include a permeable material (e.g., mesh, screen) that extends over the top and/or lower surface of the frame to inhibit vertical access to the propellers from above or below the propellers 818. Likewise, in some implementations, one or more mounting plates 820 may be affixed to the frame 804 to provide additional surface area for mounting components to the UAV 800. The mounting plates 820 may be removably coupled to the frame 804, for example, using screws, fasteners, etc. Alternatively, the mounting plates 820 may be formed as part of the frame 804.

A UAV control system 810 is also mounted to the frame 804. In this example, the UAV control system 810 is mounted between the hub 806 and a mounting plate 820. The UAV control system 810, as discussed in further detail below with respect to FIG. 9, controls and/or processes various portions of the operation, routing, navigation, communication, motor controls, and towing functions of the UAV 800.

The UAV 800 also includes one or more power modules (not shown). The power modules may be mounted to various locations on the frame. For example, in some implementations, four power modules may be mounted to each mounting plate 820 and/or to the hub 806 of the frame. The power module for the UAV may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the UAV control system 810, the lifting motors 816, etc. In some implementations, one or more of the power modules may be configured such that it can be autonomously removed and/or replaced with another power module while the UAV is landed or in flight. For example, when the UAV lands at a location, the UAV may engage with a charging member at the location that will recharge the power module.

The UAV 800 may also include a tow line coupling portion or mechanism (not shown). A tow line coupling mechanism may be configured to couple and decouple a tow line from the UAV 800. In this example, the tow line coupling mechanism or portion may be positioned beneath and coupled to the hub 806 of the frame 804 of the UAV 800. The tow line coupling mechanism or portion may be of any configuration sufficient to couple to a tow line (e.g., that is utilized for towing a user). A tow line coupling mechanism may communicate with (via wired or wireless communication) and be controlled by the UAV control system 810. In various implementations, a tow line retraction mechanism may also be included (not shown) which is configured to retract all or a portion of the tow line when a towing process is not being performed and/or when a shorter length of the tow line is to be used for a towing process. For example, the tow line retraction mechanism may include an electronically controlled spool or other mechanism onto which the tow line is wound when not in use or when a shorter length of tow line is needed, and which unwinds and extends the tow line when it is to be used for a towing process.

While the implementations of the UAV 800 discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers and motors to enable vertical takeoff and landing and a fixed wing configuration or a combination wing and propeller configuration to sustain flight while the UAV is airborne.

As noted above, while this example includes four lifting propellers, in other implementations, more or fewer propellers may be utilized as lifting propellers 818. For example, in one alternative implementation eight lifting motors 816 and corresponding lifting propellers 818 may be included. In such a configuration, the UAV 800 may be formed of two matching frames 804 that are coupled together in a stacked or clamshell configuration. Each frame may be a single carbon fiber frame that may be removably coupled together by joining the horizontal components 814A of the perimeter protective barriers of the frames 804. The frames may be screwed, bolted, riveted, welded, fused or otherwise fastened together. In other implementations, the frame 804 may be a single body configuration.

Figure 9:
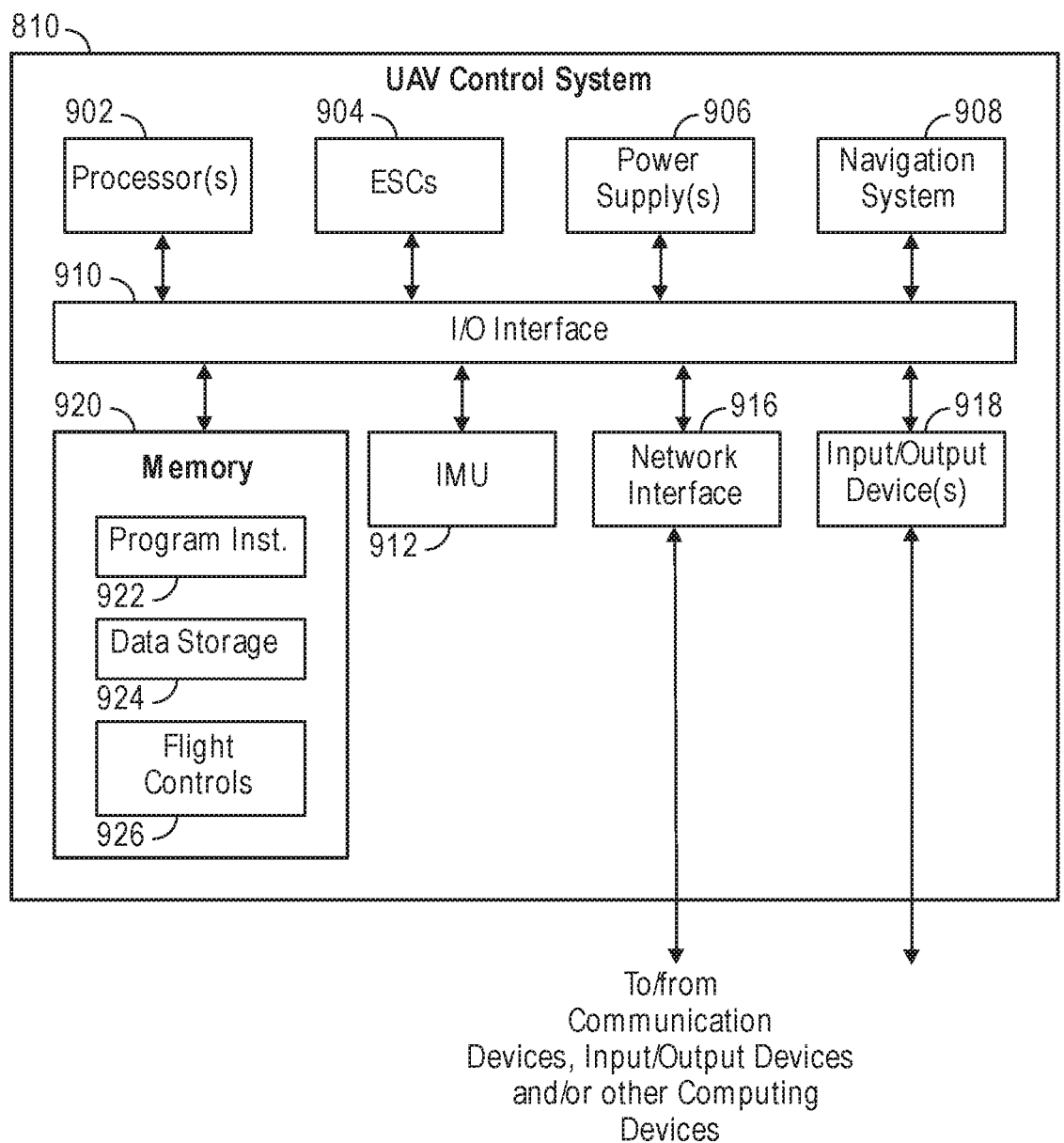
FIG. 9 is a block diagram of an illustrative implementation of an unmanned aerial vehicle control system that may be used with various implementations.

FIG. 9 is a block diagram of an illustrative implementation of a UAV control system 810 that may be used with various implementations. Similar to the examples of FIGS. 6 and 7 described above, in various implementations the block diagram of FIG. 9 may be illustrative of one or more aspects of the UAV control system 810 that may be used to implement the various systems and methods discussed herein and/or to control operation of the UAVs described herein. In the illustrated implementation, the UAV control system 810 includes one or more processors 902, coupled to a memory, e.g., a non-transitory computer readable storage medium 920, via an input/output (I/O) interface 910. The UAV control system 810 may also include electronic speed controls 904 (ESCs), power supply modules 906, a navigation system 908, and/or an inertial measurement unit (IMU) 912. In some implementations, the IMU may be incorporated into the navigation system 908. The UAV control system 810 may also include a network interface 916 and one or more input/output devices 918.

In various implementations, the UAV control system 810 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, flight paths, flight control parameters, component adjustment information, center of gravity information, towing data, and/or data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 920 as program instructions 922, data storage 924 and flight controls 926, respectively. In other implementations, program instructions, data and/or flight controls may be received, sent or stored upon different types of computer-accessible media, such as non-transitory media, or on similar media separate from the non-transitory computer readable storage medium 920 or the UAV control system 810. Generally speaking, a non-transitory, computer readable storage medium may include storage media or memory media such as magnetic or optical media, e.g., disk or CD/DVD-ROM, coupled to the UAV control system 810 via the I/O interface 910. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The ESCs 904 communicate with the navigation system 908 and/or the IMU 912 and adjust the rotational speed of each lifting motor and/or the pushing motor to stabilize the UAV and guide the UAV along a determined flight path (e.g., as part of a towing process, etc.) The navigation system 908 may include a GPS, indoor positioning system (IPS), IMU or other similar system and/or sensors that can be used to navigate the UAV 800 to and/or from a location. When a summoning instruction is received (e.g., as wirelessly transmitted or otherwise sent from a user device, remote computing resource, etc.), the navigation system 908 may be utilized for navigating to a location of a user (e.g., as determined according to the location of a user device that is carried by the user, etc.) When a departure instruction is received (e.g., as wirelessly transmitted or otherwise sent from a user device, tow control handle, remote computing resource, etc.), the navigation system 908 may be utilized for navigating to a designated location (e.g., a home base, etc.) When a tow control signal (e.g., from a tow control handle, etc.) or a tow control instruction (e.g., as produced by a control system of a tow control handle in response to a control signal from a control element, etc.) is received, the navigation system 908 or other systems of the UAV may respond by implementing the indicated tow controls/instructions (e.g., for controlling the direction, speed, etc. of the UAV). In some instances, the navigation system 908 may at least partially override or otherwise modify the received tow control signals/instructions (e.g., for safety of the UAV and/or user, to avoid obstacles, etc.)

The network interface 916 may be configured to allow data to be exchanged between the UAV control system 810, other devices attached to a network, such as other computer systems (e.g., remote computing resources), and/or with control systems of other devices (e.g., a tow control handle, a user device, another UAV, etc.) For example, the network interface 916 may enable wireless communication between the UAV that includes the control system 810 and a UAV control system that is implemented on one or more remote computing resources. As another example, the network interface 916 may enable wireless communication between the UAV that includes the control system 810 and a control system of a tow control handle and/or user device. For wireless communication, an antenna of the UAV or other communication components may be utilized. As another example, the network interface 916 may enable wireless communication between numerous devices (e.g., UAVs, tow control handles, user devices, etc.) In various implementations, the network interface 916 may support communication via wireless general data networks, such as a Wi-Fi network. For example, the network interface 916 may support communication via telecommunications networks, such as cellular communication networks, satellite networks, and the like.

Input/output devices 918 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 918 may be present and controlled by the UAV control system 810. One or more of these sensors may be utilized to assist in landing as well as to avoid obstacles during flight and for other navigation functions. For example, the UAV may utilize sensors in combination with sense and avoid procedures for avoiding obstacles that are detected or otherwise determined along a flight path for the UAV during a towing process. As another example, the UAV and/or tow control handle may include sensors and/or other capabilities for detecting obstacles in a travel path of the user and/or tow line during the towing process, for which the UAV may be flown so that the tow line and the user avoid the obstacles. In various implementations, a designated travel area may be determined for at least one of the user or the UAV, and the flying of the UAV may be controlled to prevent at least one of the UAV or the user from traveling outside of the designated travel area.

In various implementations, certain devices (e.g., tow control handles, user devices, UAVs, etc.) may function as input/output devices relative to one another. For example, in one configuration, a tow control handle and a user device may function as input/output devices relative to a UAV. In such a configuration, the user device and tow control handle may wirelessly communicate with the UAV as input/output devices and/or the tow control handle may include a wired connection (e.g., with a wire through or attached to the tow line) to the UAV. In one such configuration, the control system for the tow control handle and/or user device may be merged with or otherwise included in the control system of the UAV. For example, the tow control handle may include control elements (e.g., buttons, switches, sensors, etc.) for which the signals from the control elements may be provided directly to the control system of the UAV for controlling the various operations. As another example, in one configuration a UAV may function as an input/output device relative to a tow control handle and/or user device.

As shown in FIG. 9, the memory may include program instructions 922, which may be configured to implement the example processes and/or sub-processes described herein, including those related to towing processes and control of certain aspects by a tow control handle. The data storage 924 may include various data stores for maintaining data items that may be provided for determining flight paths, landing, engaging/disengaging the pushing motors, performing towing functions, flying to locations as part of summoning and/or departure instructions, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

With respect to the examples provided above with respect to FIGS. 6, 7 and 9, those skilled in the art will appreciate that the control systems 600, 700 and 810 are merely illustrative and is not intended to limit the scope of the present disclosure. In particular, the computing system and devices may include any combination of hardware or software that can perform the indicated functions. The control systems 600, 700 and 810 may also be connected to other devices that are not illustrated, or instead may operate as stand-alone systems. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated control systems 600, 700 and 810. Some or all of the system components or data structures may also be stored (e.g., as instructions or structured data) on a non-transitory, computer-accessible medium or a portable article to be read by an appropriate drive, various examples of which are described herein. In some implementations, instructions stored on computer-accessible mediums separate from the control systems 600, 700 and 810 may be transmitted to the control systems 600, 700 and 810 via transmission media or signals such as electrical, electromagnetic, or digital signals, conveyed via a communication medium such as a wireless link. Various implementations may further include receiving, sending or storing instructions and/or data implemented in accordance with the foregoing description upon computer-accessible mediums. Accordingly, the techniques described herein may be practiced with other control system configurations.

Figure 10:
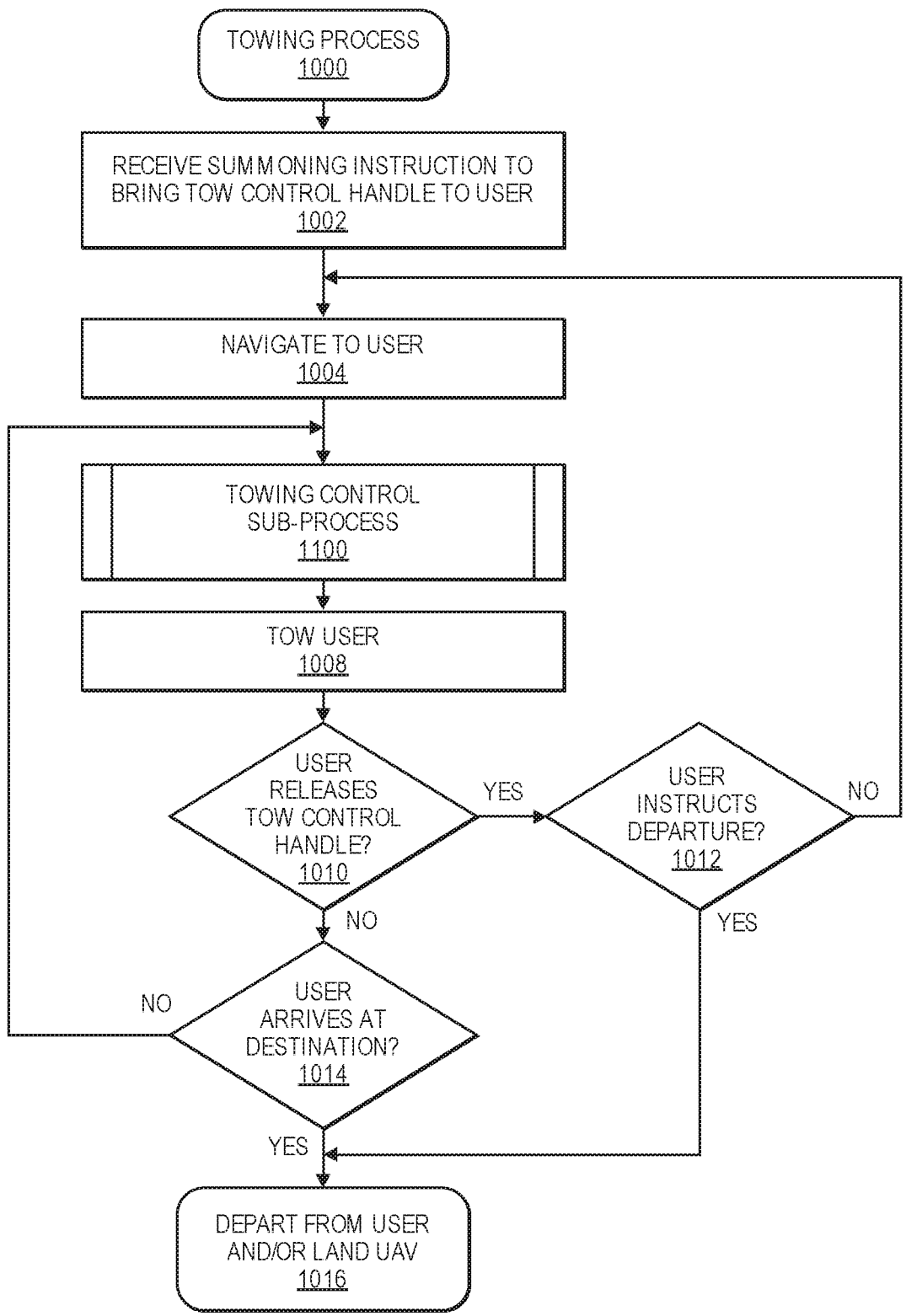
FIG. 10 is a flow diagram illustrating an example process for towing a user, according to some implementations.

FIG. 10 is a flow diagram illustrating an example process 1000 for towing a user, according to some implementations. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 1000 begins with a receipt of a summoning instruction to bring a tow control handle to a user, as in 1002. In various implementations, a summoning instruction may be wirelessly transmitted or may otherwise be sent from a user device to a UAV in response to a user actuating a control element (e.g., a button, switch, etc.) on the user device. After the summoning instruction is received, the UAV is navigated to the user, as in 1004. In various implementations, the user device may include GPS or other capabilities as part of a location system so as to enable the user device to be located and the UAV to be navigated to the user. In various implementations, once the UAV arrives at the user location, the location of the user device and/or user may further be utilized and/or determined (e.g., utilizing a location system of the user device, a camera of the UAV, etc.) so as to enable the tow control handle to be positioned so that it can be engaged by the user. Once the UAV has been navigated to the user and the user engages the tow control handle, a towing control sub-process is initiated, as in 1100, as will be described in more detail below with respect to FIG. 11. As the towing control sub-process is performed, the user is towed by the UAV, as in 1008.

As the user is towed, monitoring is performed to determine whether the user has released the tow control handle, as in 1010. In various implementations, various sensors, control elements, etc. of the tow control handle, user device and/or UAV may be utilized to determine when a user has released the tow control handle. For example, one or more sensors in the tow control handle may be utilized to determine the presence or absence of a user's hands, and to indicate when a user has released the tow control handle. As another example, an imaging device or other sensor of the UAV may be utilized to determine when the user has released the tow control handle. As another example, a signal may be received from the user device (e.g., in accordance with an actuation of a control element by a user, etc.) which indicates when a user has released the tow control handle. If the user has released the tow control handle, a determination is made as to whether the user has initiated a departure instruction, as in 1012. In various implementations, a user may actuate a control element on a user device (e.g., pressing a button, etc.) to initiate a departure instruction. As another example, the tow control handle may include a control element that may be actuated by a user to initiate a departure instruction. If it is determined that the user has not initiated a departure instruction, the process returns to block 1004, where the UAV navigates back to the user so that the user may re-engage the tow control handle.

If the user has not released the tow control handle, as in 1010, a determination is made as to whether the user has arrived at a towing destination, as in 1014. If it is determined that the user has not arrived at a towing destination, the process returns to block 1100, where the UAV continues to be controlled for towing the user. If the user has arrived at the towing destination, as in 1014, or if the user has initiated a departure instruction after releasing the tow control handle, as in 1012, the UAV departs from the user and/or lands, as in 1016. In various implementations, the UAV may receive instructions for departing to a specified location after a departure from a user. For example, a UAV may be instructed to return to a home base (e.g., with charging facilities, etc.) or other designated location (e.g., at a bottom of a ski slope after towing a user up to a skiing area, at a shore location after towing a surfer out to a surfing location, etc.) In various implementations, the UAV may alternatively receive instructions to land proximate to the user after the user has arrived at a tow destination (e.g., if the UAV is to be picked up or otherwise acquired by the user for storage, transport by another vehicle, etc.)

Figure 11:
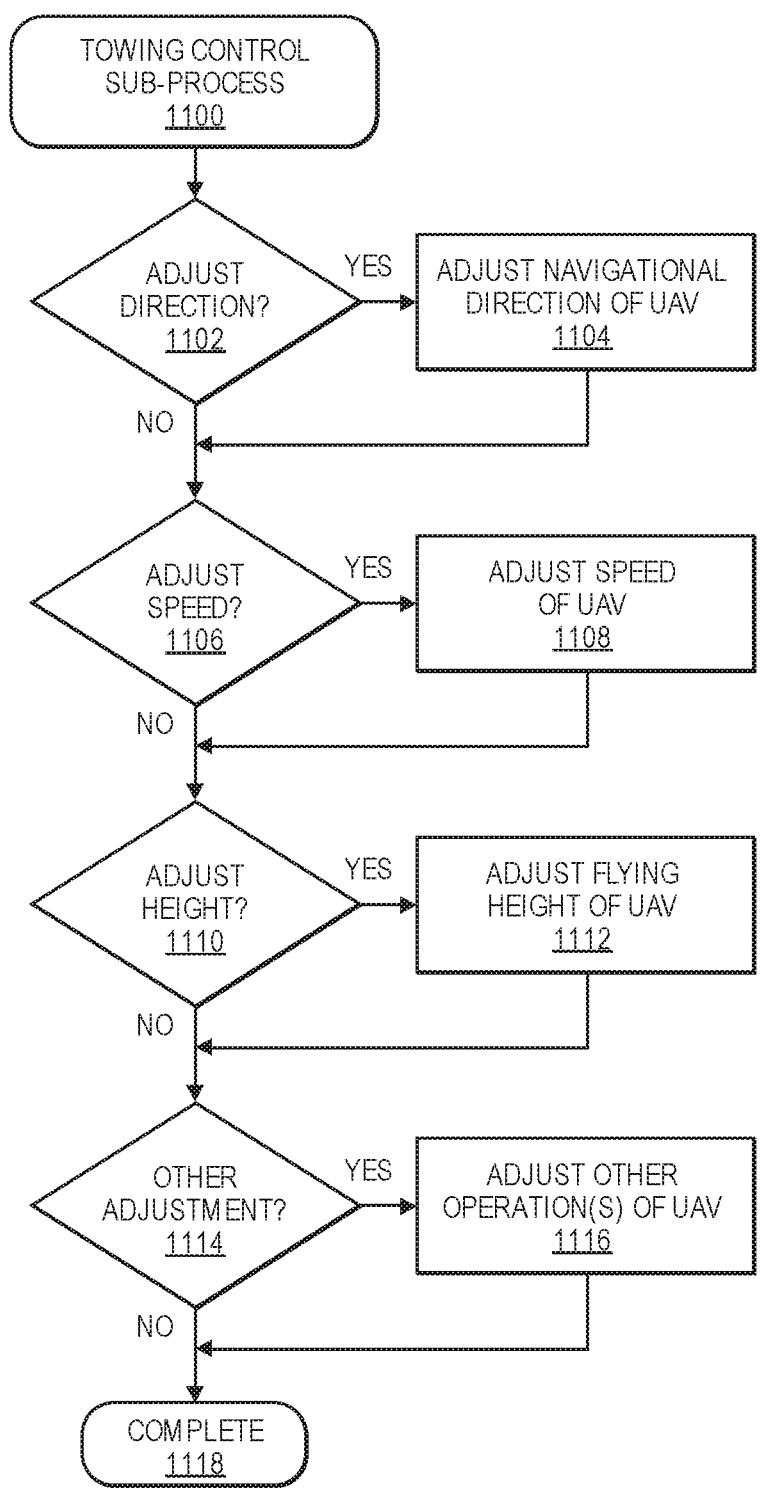
FIG. 11 is a flow diagram illustrating an example towing control sub-process, according to some implementations.

FIG. 11 is a flow diagram illustrating an example towing control sub-process 1100, according to some implementations. The example sub-process begins with a determination as to whether a flying direction of the UAV is to be adjusted, as in 1102. If the direction is to be adjusted, a control system of the UAV is utilized to adjust the navigational direction in which the UAV is flying, as in 1104. In various implementations, a navigation system of the UAV may operate to modify or override certain control signals for adjustments in direction (e.g., for safety of the user and UAV, such as avoiding obstacles, unsafe travel areas, etc.)

In addition to directional adjustments, a determination is also made as to whether the speed of the UAV is to be adjusted, as in 1106. If the speed is to be adjusted, the propulsion system of the UAV is controlled to adjust a flying speed, as in 1108. In various implementations, a relative speed of a UAV may depend on various factors (e.g., a headwind, a relative incline along which a user is being towed, etc.), for which appropriate adjustments to achieve a desired speed may be made.

In addition to the speed adjustments, a determination is also made as to whether a height is to be adjusted, as in 1110. If the height is to be adjusted, the propulsion system of the UAV is controlled to adjust a flying height, as in 1112. In various implementations, different users may have different preferences for flying heights depending on the height of the user, arm length and maneuvers that may be performed while being towed, etc. For example, a user who is intending to make wide turns at the end of the tow line may prefer a different flying height of the UAV than a user who is planning to remain in a straight line while being towed.

In addition to the flying height adjustments, a determination is also made as to whether certain other adjustments with respect to the control of the UAV are to be made, as in 1114. If other adjustments are to be made, corresponding other operations of the UAV are adjusted, as in 1116. For example, a UAV may include other capabilities and operations (e.g., autopilot, cruise control, flying patterns, maneuvers, etc.) that may be selected by a user as part of a towing process. In certain instances, a user may select various operations to be implemented based on an action that the user wishes to perform during the towing process. For example, a button may be provided on the control handle that corresponds to a particular maneuver (e.g., skiing over a jump), wherein once the user presses the button at the initiation of the maneuver, the speed and other functions of the UAV may be automatically controlled (e.g., slowing down and/or speeding up at appropriate times, maintaining a straight flight path, etc.) to assist the user in performing the maneuver. In various implementations, the lifting motors of the UAV may also be capable of generating enough rotational speed with the propellers to perform certain other types of maneuvers and/or procedures. For example, a UAV may be capable of lifting a user into the air (e.g., as part of a selected maneuver, due to the user wishing to complete further travel by air, due to a detected danger or injury where the user is to be flown to safety, etc.) If no other towing adjustments are to be made, the sub-process completes, as in 1118.

Figure 12:
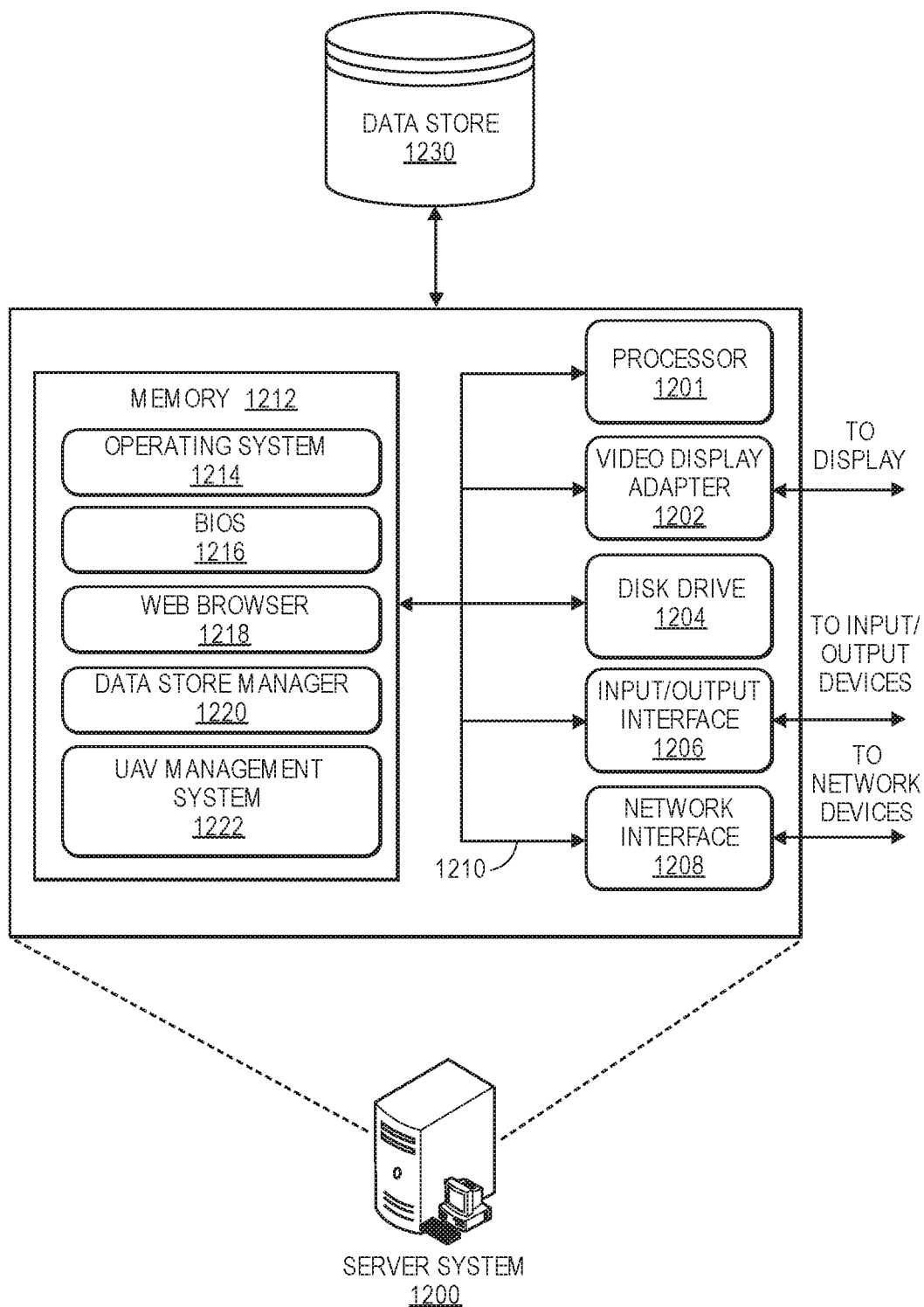
FIG. 12 is a block diagram of an illustrative implementation of a server system that may be used with various implementations.

FIG. 12 is a block diagram of an illustrative implementation of a server system 1200 that may be used with various implementations. In various implementations, the server system 1200 may function as a remote computing resource that is able to communicate over a network with various devices (e.g., a tow control handle 200, a user device 300, a UAV 800, etc.) One or more such server systems 1200 may form a portion of a network-accessible computing platform implemented as a computing infrastructure of processors, storage, software, data access, and other components that is maintained and accessible via a network, which may represent wired technologies (e.g., wires, USB, fiber optic cable, etc.), wireless technologies (e.g., RF, cellular, satellite, Bluetooth, etc.), and/or other connection technologies. The network may carry data between the various devices (e.g., a tow control handle 200, a user device 300, a UAV 800, etc.) and the server system 1200. Communications to and from the various devices may utilize wireless antennas of the various devices, and may be to and from associated control systems of the various devices (e.g., as described above with respect to FIGS. 6, 7 and 9). The various devices may also communicatively couple to each other (e.g., over the network, through direct wireless or wired links, etc.)

The server system 1200 may include a processor 1201, such as one or more redundant processors, a video display adapter 1202, a disk drive 1204, an input/output interface 1206, a network interface 1208, and a memory 1212. The processor 1201, the video display adapter 1202, the disk drive 1204, the input/output interface 1206, the network interface 1208, and the memory 1212 may be communicatively coupled to each other by a communication bus 1210.

The video display adapter 1202 provides display signals to a local display (not shown in FIG. 12) permitting an operator of the server system 1200 to monitor and configure operation of the server system 1200. The input/output interface 1206 likewise communicates with external input/output devices not shown in FIG. 12, such as a mouse, keyboard, scanner, or other input and output devices that can be operated by an operator of the server system 1200. The network interface 1208 includes hardware, software, or any combination thereof, to communicate with other computing devices. For example, the network interface 1208 may be configured to provide communications between the server system 1200 and other computing devices, such as a UAV, tow control handle, user device, other electronic device, etc.

The memory 1212 generally comprises random access memory (RAM), read-only memory (ROM), flash memory, and/or other volatile or permanent memory. The memory 1212 is shown storing an operating system 1214 for controlling the operation of the server system 1200. A binary input/output system (BIOS) 1216 for controlling the low-level operation of the server system 1200 is also stored in the memory 1212.

The memory 1212 additionally stores program code and data for providing network services to a UAV management system 1222. Accordingly, the memory 1212 may store a browser application 1218. The browser application 1218 comprises computer executable instructions that, when executed by the processor 1201, may generate or otherwise obtain configurable markup documents such as Web pages. The browser application 1218 communicates with a data store manager application 1220 to facilitate data exchange between the UAV data store 1230 and other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 1200 can include any appropriate hardware and software for integrating with the UAV data store 1230 as needed to execute aspects of one or more applications for the UAV management system 1222, towing processes, etc.

The data store 1230 can include several separate data tables, databases or other data storage mechanisms and media for storing data relating to a particular aspect. For example, the data store 1230 illustrated includes UAV information, weather information, wind speeds and directions, travel path information, source location information, destination location information, towing information, etc., which can be used to generate and deliver information to the UAV management system 1222, UAVs, tow control handles, user devices and/or users. It should be understood that there may be many other aspects that may be stored in the UAV data store 1230. The data stores 1230 are operable, through logic associated therewith, to receive instructions from the server system 1200 and obtain, update or otherwise process data in response thereto.

The memory 1212 may also include the UAV management system 1222 noted above. The UAV management system 1222 may be executable by the processor 1201 to implement one or more of the functions of the server system 1200. In one implementation, the UAV management system 1222 may represent instructions embodied in one or more software programs stored in the memory 1212. In another implementation, the UAV management system 1222 can represent hardware, software instructions, or a combination thereof.

The UAV management system 1222 may be configured, for example, to communicate with the UAVs, tow control handles, user devices, etc. In various implementations, the general activities of UAVs, including those related to towing users, may be recorded, monitored, coordinated, and/or partially or otherwise controlled by the UAV management system 1222. For example, the UAVs and/or the UAV management system 1222 may monitor and/or determine travel paths for flying to and from locations and users and/or for towing users. In various implementations, the UAV management system 1222 may send instructions, needed information (e.g., regarding users, travel paths, etc.), and/or otherwise partially or completely control the UAVs for travelling to and from the users, flying along travel paths, towing the users, etc. As an example, information and/or instructions may be transmitted to a UAV that indicates a travel path for flying to and/or from a user, and/or for towing a user, etc. As noted above, the various devices may also communicatively couple to each other (e.g., over the network, through direct wireless or wired links, etc.) In various implementations, such communications may be utilized for various purposes. For example, the UAVs, tow control handles and/or user devices may communicate with each other and/or a central management system for avoiding collisions between the UAVs, users and/or tow lines. In various implementations, a network of UAVs may communicate and/or coordinate activities for performing various functions. For example, a virtual ski lift may be created wherein a limited number of UAVs may be used for providing towing services for a large number of users. In such a configuration, if more users move to a particular area (e.g., a particular ski slope), additional UAVs may be summoned and/or otherwise instructed to travel to the particular area to help meet the current demand.

In various implementations, the UAV management system 1222 and/or other remote computing resources may also receive tracking data (e.g., GPS) regarding the coordinates of the UAVs. The GPS data may be utilized for various purposes, such as answering location status requests, sending notifications regarding the current locations of the UAVs, etc. For example, a user may request that a notification be sent when a UAV that has been summoned for a towing process is approaching. As another example, notifications may be sent to UAVs when they are approaching the location of a user who is to be towed, etc. Notifications may also be sent from UAVs to remote computing resources and/or the UAV management system 1222 regarding various events (e.g., when a UAV is approaching a user's location, when a UAV has begun towing a user, when a UAV has completed towing a user, etc.)

The server system 1200, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction in FIG. 12 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A towing system comprising:
   an unmanned aerial vehicle (UAV) comprising a propulsion system that is configured to fly the UAV;
   a tow control handle that is coupled by a tow line to the UAV, the tow control handle comprising:
   a handle control system; and
   at least one control element that is configured to provide a control signal that is utilized to control at least one of a direction or a speed of the UAV; and
   a user device comprising:
   a device control system; and
   a user interface comprising:
   a summoning control element that is configured to be actuated by a user, wherein the device control system is configured to respond to the actuation of the summoning control element by wirelessly transmitting a summoning instruction to summon the UAV to the user's location to enable the user to engage the tow control handle and be towed by the UAV; and
   a departure control element that is configured to be actuated by the user after the user has released the tow control handle, wherein the device control system is configured to respond to the actuation of the departure control element by wirelessly transmitting a departure instruction to direct the UAV to depart from the user and travel without the user to a designated location.

2. The towing system of claim 1, wherein the control element of the tow control handle comprises a sensor that senses a rotation of at least a portion of the tow control handle, and the control signal is provided based at least in part on the sensed rotation.

3. The towing system of claim 1, wherein the control element of the tow control handle comprises at least one of a button or switch, and the control signal is provided based at least in part on an actuation of the at least one button or switch.

4. The towing system of claim 3, wherein the tow control handle comprises a hand engagement area that is located on a central portion of the tow control handle, and the at least one switch or button is located on an end portion of the tow control handle that is not within the hand engagement area.

5. The towing system of claim 1, wherein the user device further comprises a location system that enables the location of the user device to be determined.

6. The system of claim 5, wherein the location system of the user device includes GPS, and when the summoning instruction is wirelessly transmitted the location system of the user device is utilized to determine the location of the user to enable the UAV to fly to the user's location.

7. A towing system, comprising:
a tow control handle, comprising:
a tow line coupling portion that couples to a tow line that is coupled to an unmanned aerial vehicle (UAV);
a handle control system;
a first control element to provide a first control signal that is utilized to control a direction of the UAV;
a second control element to provide a second control signal that is utilized to control a speed of the UAV; and
a user device comprising:
a device control system;
a summoning control element that is configured to be actuated by a user, wherein the device control system is configured to respond to the actuation of the summoning control element by wirelessly transmitting a summoning instruction to summon the UAV to the user's location to enable the user to engage the tow control handle and be towed by the UAV; and
a departure control element that is configured to be actuated by the user after the user has released the tow control handle, wherein the device control system is configured to respond to the actuation of the departure control element by wirelessly transmitting a departure instruction to direct the UAV to depart from the user and travel without the user to a designated location.

8. The towing system of claim 7, wherein the tow control handle further comprises a location system that enables the location of the tow control handle to be determined.

9. The towing system of claim 7, wherein the tow control handle further comprises a sensor to indicate when a user has released the tow control handle.

10. The towing system of claim 7, wherein the first control element comprises at least one of a sensor, a button, or a switch.

11. The towing system of claim 7, wherein the second control element comprises a sensor to sense a rotation of a rotatable portion of the tow control handle.

12. The towing system of claim 7, wherein the tow control handle further comprises a central portion and an end portion, wherein the central portion includes a hand engagement area and at least one of the first or second control elements is located on the end portion.

13. The towing system of claim 7, wherein the tow control handle further comprises first and second hand engagement areas, wherein at least one of the first or second control elements is located between the first and second hand engagement areas.

14. The towing system of claim 7, wherein the tow control handle further comprises a haptic feedback device that provides feedback to a user.

15. The system of claim 7, wherein the user device further comprises a location system including GPS, and when the summoning instruction is wirelessly transmitted the location system of the user device is utilized to determine the location of the user to enable the UAV to fly to the user's location.

16. A computer implemented method to tow a user, the computer implemented method comprising:
under control of one or more computing systems configured with executable instructions,
receiving a summoning instruction from a user device, wherein the user device wirelessly transmits the summoning instruction in response to a user actuating a summoning control element on the user device and the summoning instruction is for summoning an unmanned aerial vehicle (UAV) to a user, wherein a tow control handle is coupled by a tow line to the UAV;
determining a location of the user based at least in part on the location of the user device that is carried by the user;
flying the UAV to position the tow control handle proximate to the user;
after the user has engaged the tow control handle, controlling at least one of a direction or speed of the UAV based at least in part on a control signal that is provided by a control element of the tow control handle; and
receiving a departure instruction from the user device after the user has released the tow control handle, wherein the user device wirelessly transmits the departure instruction in response to the user actuating a departure control element on the user device and the departure instruction directs the UAV to travel without the user to a designated location.

17. The computer implemented method of claim 16, further comprising receiving a height adjustment instruction from the user device that controls an adjusting of a height at which the UAV is flying to bring the tow control handle closer to the user.

18. The computer implemented method of claim 16, further comprising sensing an obstacle along a travel path of the UAV and flying the UAV to avoid the obstacle.

19. The computer implemented method of claim 16, further comprising sensing an obstacle along a travel path of at least one of the tow line or the user, and flying the UAV so that the tow line and the user avoid the obstacle.

20. The computer implemented method of claim 16, further comprising determining a designated travel area for at least one of the user or the UAV, and controlling the flying of the UAV to prevent at least one of the UAV or the user from travelling outside of the designated travel area.

21. The computer implemented method of claim 16, further comprising flying the UAV to lift the user into the air based at least in part on a sensed obstacle, a sensed danger, or a control signal that is provided by a control element of the tow control handle.

22. The computer implemented method of claim 16, wherein the determining of the location of the user comprises utilizing a location system of the user device which includes GPS.

23. The computer implemented method of claim 16, wherein the user is positioned on a conveyance device that moves over a surface as the user is towed by the UAV, and after the user is towed to a first location and the departure instruction is wirelessly transmitted to cause the UAV to depart from the user and travel to the designated location without the user, the conveyance device that the user is positioned on moves over the surface to convey the user from the first location to the designated location.

* * * * *